United States Patent [19]
Serizawa et al.

[11] Patent Number: 6,135,538
[45] Date of Patent: Oct. 24, 2000

[54] DOOR WIRE HARNESS ARRANGEMENT STRUCTURE FOR VEHICLES

[75] Inventors: Yasuyoshi Serizawa; Mitsunobu Kato; Keizo Nishitani; Daisuke Goto, all of Shizuoka, Japan

[73] Assignee: Yazaki Corporation, Tokyo, Japan

[21] Appl. No.: 09/007,807

[22] Filed: Jan. 15, 1998

[30] Foreign Application Priority Data

Feb. 6, 1997 [JP] Japan .................................. 9-023762

[51] Int. Cl.[7] ........................................................ B60J 5/00
[52] U.S. Cl. ........................................ 296/146.7; 174/64
[58] Field of Search ................................ 296/152, 146.7, 296/146.12; 174/53, 54, 61, 64

[56] References Cited

U.S. PATENT DOCUMENTS

| | | | |
|---|---|---|---|
| 4,862,011 | 8/1989 | Wright | 296/146 |
| 5,739,470 | 4/1998 | Takeda | 174/97 |
| 5,832,960 | 11/1998 | Amatsutsu et al. | 138/110 |
| 5,877,936 | 3/1999 | Nishitani et al. | 361/600 |
| 5,879,047 | 3/1999 | Yamaguchi et al. | 296/146.7 |
| 5,884,961 | 3/1999 | Serizawa et al. | 296/146.7 |
| 5,897,157 | 4/1999 | Yamaguchi et al. | 296/146.7 |

*Primary Examiner*—D. Glenn Dayoan
*Assistant Examiner*—Jason Morrow
*Attorney, Agent, or Firm*—Armstrong, Westerman, Hattori, McLeland & Naughton

[57] ABSTRACT

A door wire harness arrangement structure is provided. In this structure, a wire harness protector is made up of a soft elastic member and thin flexible plates, slidable inside a door, and flexible and restorable in the thickness direction. The soft elastic member may have an oval-shaped cross section. The wire harness protector may be made up of a pair of thin flexible plates and soft elastic members which join the thin plates together at both ends in the width direction. The wire harness protector may have a flat shape, and be provided with a flat wire harness inside. It is also possible to flexibly attach only the flat harness between the door and the main body without the wire harness protector. Slide protrusions and/or fabric for reducing frictional resistance are provided on both sides of the flat harness protector. The flat wire harness is made up of wires secured to a thin resin plate with an adhesive layer or a laminate layer.

4 Claims, 7 Drawing Sheets

DOOR WIRE HARNESS ARRANGEMENT STRUCTURE FOR VEHICLES

BACKGROUND OF THE INVENTION

1. Field of the Invention

The present invention relates to a door wire harness arrangement structure in which a flexible wire harness protector and a flat wire harness are employed to electrically connect a door of a vehicle to its main body.

2. Related Art

Figure 16:
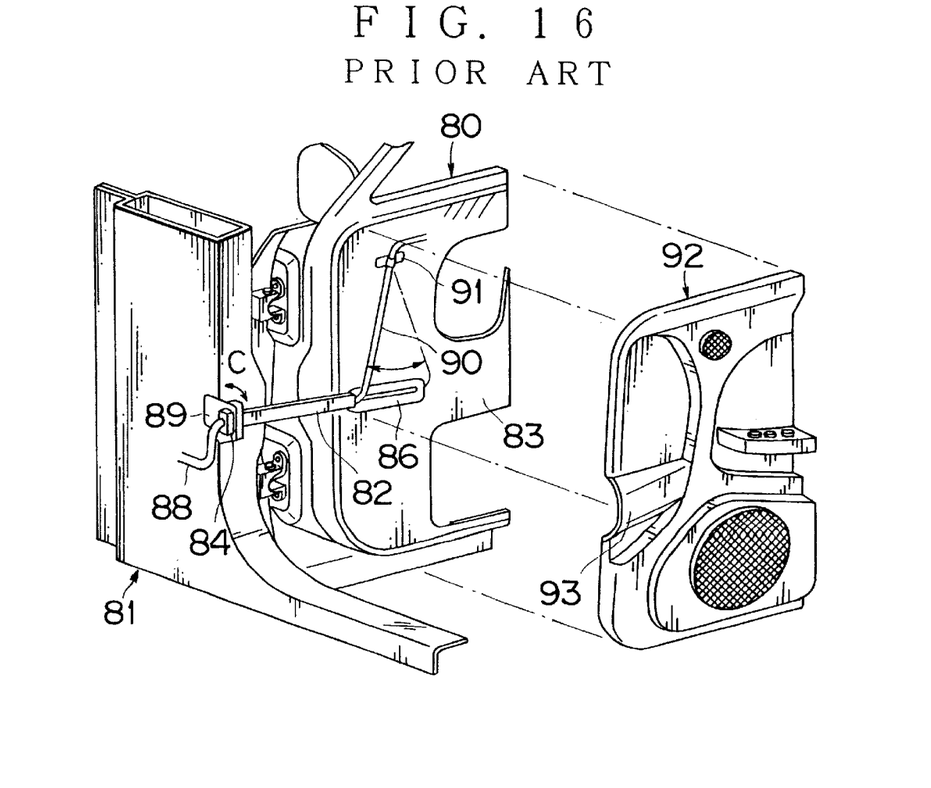
FIG. 16 is an exploded perspective view of the prior art.
Figure 17:
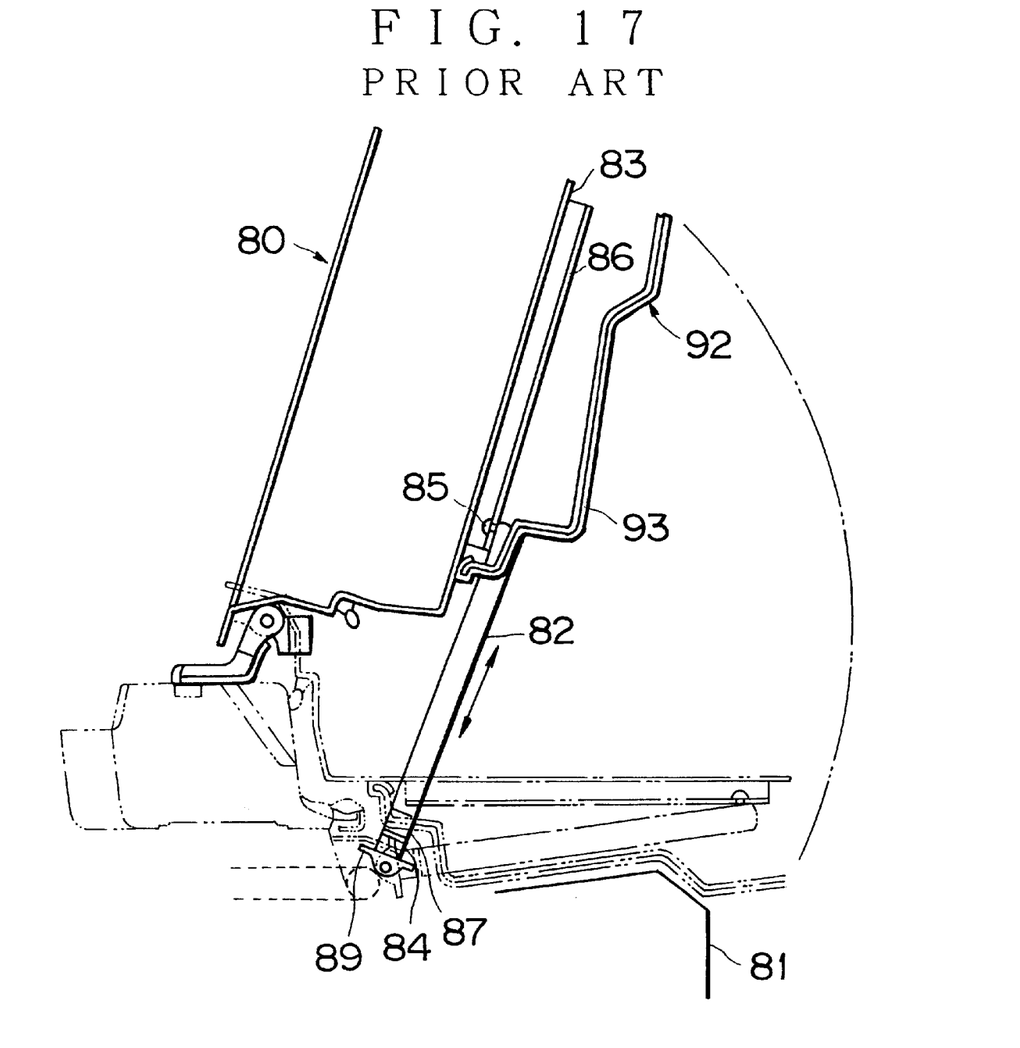
FIG. 17 is a plan view of the prior art.

FIGS. 16 and 17 illustrate the door wire harness arrangement structure disclosed in Japanese Patent application No. 8-176687 submitted by the present applicant.

In this structure, a wire harness is arranged between a door 80 and a main body 81 inside a stiff wire harness protector 82 made of a synthetic resin. The wire harness protector 82 can slide along a door inner panel 83 in synchronization with the movements of the door 80, and it can swing freely, with a connector 84 of the main body 81 being a supporting point, as shown in FIG. 17.

A slide protrusion 85 (shown in FIG. 17) is provided at the rear end of the wire harness protector 82, and slidably engaged with a slide guide 86 on the door inner panel 83. A connector 87 (FIG. 17) is provided at the front end of the wire harness protector 82, and connected to the connector 84 of a wire harness 88 of the main body. The connector 84 on the main body side is rotatable via a bracket 89 in the direction of the arrow C in synchronization with the rocking of the wire harness protector 82.

A wire harness 90 extending through the rear opening of the wire harness protector 82 is secured with a clip 91 at the top so as to swing along the door inner panel 83. The door inner panel 83 is connected to a door trim panel 92, and the wire protector 82 is situated between the door inner panel 83 and the door trim panel 92.

With the conventional structure, however, there has been a problem that the number of components employed and the production costs are inevitably increased, because it is necessary to employ a mechanism for rotatably supporting the connector 84 of the main body. Also, as shown in FIG. 17 (indicated by a broken line), it is necessary to form the escape bulging portion 93 on the door trim panel 92 so as to prevent interference between the wire harness protector 82 and the door trim panel 92 when closing the door. As a result of this, the door trim panel might be limited or even damaged in its design and outlook. As for the position of the wire harness protector 82, there has been a problem that it cannot be commonly used among different types of vehicle, because its position is strictly limited. Further problems with the wire harness protector 82 are that it tends to be thick and occupy a large space.

SUMMARY OF THE INVENTION

An object of the present invention is to provide a door wire harness arrangement structure which can eliminate the necessity to employ a connector rotating mechanism on the main body side, and an escape bulging portion from the door trim panel, enable the wire harness protector to be commonly used in vehicles of different types, and dramatically reduces the space occupied by the wire harness protector.

To achieve the above object, one aspect of the present invention provides a door wire harness arrangement structure in which a wire harness protector is slidably provided to a door of a vehicle, a door wire harness is arranged inside the wire harness protector, and the connector of the door wire harness is connected to the connector of the main body at the front end of the wire harness protector. In this structure, the wire harness protector is made up of a soft elastic member and thin flexible plates, and is flexible and restorable in the thickness direction.

In another aspect of the present invention, the wire harness protector is made up of a soft elastic member having an oval-shaped cross section, and a pair of belt-like thin flexible plates provided on both ends of the soft elastic member in the width direction.

In yet another aspect of the present invention, the wire harness protector is made up of a pair of thin flexible plates facing to each other and soft elastic members which join the thin flexible members together at both ends in the width direction. In such structure, the wire harness protector is formed into a flat shape, and a flat wire harness is arranged inside the wire harness protector.

In further aspect of the present invention, the flat wire harness is folded and then held inside the door of the vehicle. The front end of the flat wire harness may be connected to the main body through connectors. The flat wire harness may be flexibly arranged between the door and the main body. In such structure, the flat wire harness is provided with slide protrusions or a cover fabric for reducing frictional resistance on both sides. The flat wire harness is made up of a thin resin plate and wires fixed to the resin plate with an adhesive layer or a laminate layer. The flat wire harness may also be made up of two thin resin plates holding wires between them, and elastic members at both ends of the thin resin plates in the width direction.

The above and other objects and features of the present invention will be more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
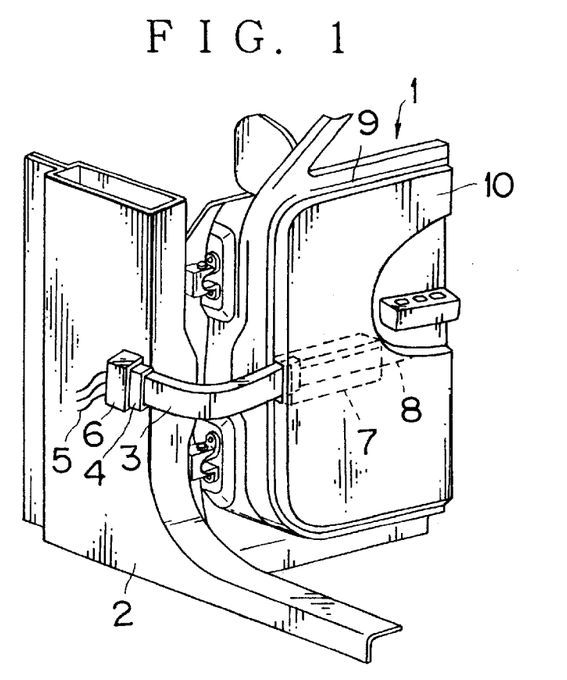
FIG. 1 is a perspective view of a door wire harness arrangement structure for vehicles of the present invention.

FIG. 1 is a schematic view of the door wire harness arrangement structure for vehicles of the present invention.

This structure includes a flexible wire harness protector 3 extending from a vehicle door 1 to a vehicle main body 2. The rear end of the wire harness protector 3 is slidably inserted into the door 1. The wire harness protector 3 is provided at its front end with a connector 4 of a door wire harness 8 so as to secure a connector 6 of a wire harness on the vehicle body to which the connector 4 is connected.

The door wire harness 8 is inserted into the wire harness protector 3, extending to the connector 4. When the door is closed, the wire harness protector 3 is received by a protector case 7 inside the door. The protector case 7 is provided on a door inner panel 9 or a door trim panel 10. Being flexible, the wire harness protector 3 bends in the thickness direction of the door when opening or closing the door. This eliminates the need to form an escape bulging portion on the door trim panel 10 as in the prior art. The need to oscillate the connector 6 on the vehicle body is eliminated, too.

Figure 2:
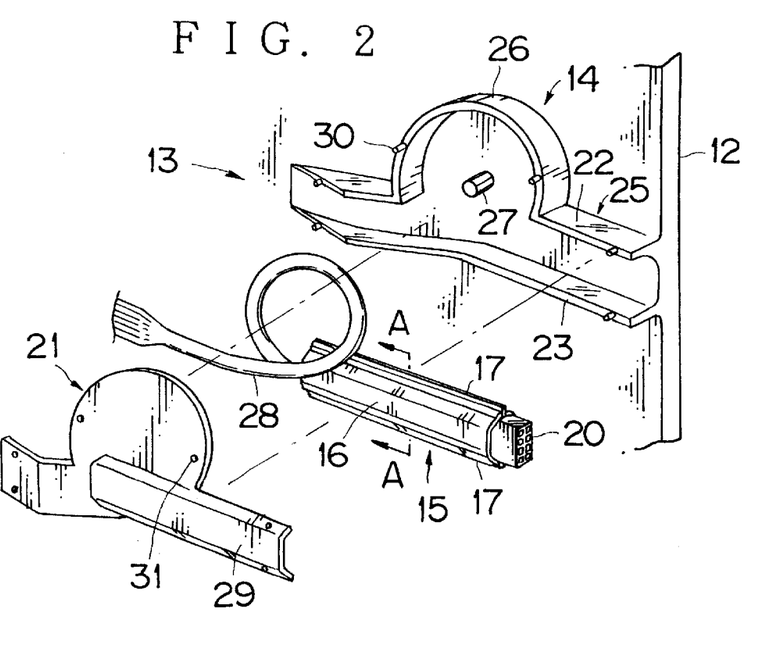
FIG. 2 is an exploded perspective view of a first embodiment of the door wire harness arrangement structure for vehicles of the present invention.

FIG. 2 shows a first embodiment of the door wire harness arrangement structure of the present invention.

In this structure, a door trim 12 made of a synthetic resin is integrally provided with a main body 14 of a protector case 13. A flexible wire harness protector 15 is slidably engaged with the main body 14.

Figure 3:
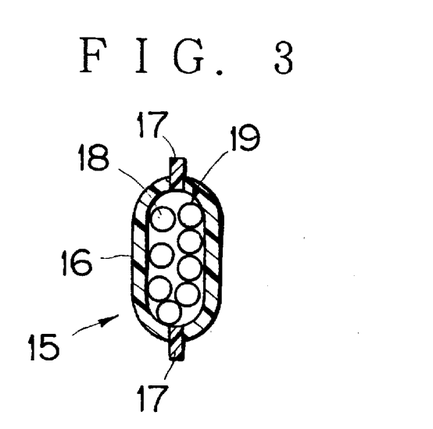
FIG. 3 is a sectional view taken along the line A—A of FIG. 2.

FIG. 3 is a vertical sectional view of the wire harness protector 15 consisting of a soft elastic member 16, such as elastomer, and thin resin plates (thin flexible plates) 17. The soft elastic member 16 is formed into an oval shape as shown in the sectional view, or into a pair of shallow buckets jointed to each other with the thin resin plates 17.

The thin resin plates 17 are shaped like belts and have elasticity in the thickness direction. The pair of thin resin plates 17 are vertically provided at both ends of the wire harness protector 15 in its width direction. The thin resin plates 17 are secured to the soft elastic member 16 by integrally molding or adhering or welding. Like the thin resin plates 17, the soft elastic member 16 is also flexible in the thickness direction. The wire harness protector 15 is given a shape retaining function and a restoring force in the thickness direction by virtue of the thin resin plates 17, so as to prevent the wire harness protector 15 from sagging, and to restore its shape quickly after closing the door. Thus, the wire harness protector 15 can slide surely and smoothly.

A wire harness 19 consisting of a plurality of wires 18 is inserted through the wire harness protector 15.

In FIG. 2, a connector 20 is fixed to the front end of the wire harness protector 15 by pushing or adhering. The connector 20 holds terminals (not shown) which extend to the respective wires 18.

The protector case 13 is made up of the main body 14 and a cover 21. The main body 14 consists of a channel-like slide guide portion 25 formed by a pair of side walls 22 and 23, and a semicircular harness receiving portion 26 which extends from the mid section of the upper side wall 22. The wire harness protector 15 is internally engaged with the slide guide portion 25 in a slidable state backward and forward.

Slide protrusions (not shown) may be formed at the rear ends of the thin resin plates 17, and guide grooves for guiding the slide protrusions may be provided to the slide guide portion 25. A harness supporting pin 27 protrudes from the harness receiving portion 26. A wire harness 28 extending from the wire protector 15 is bent like a ring, and positioned flexibly around the outer periphery of the harness supporting pin 27. This part of the structure is suggested in the specification of another application. The wire harness protector slidably attached to the door trim panel has already been suggested in the specification of Japanese Patent Application No. 8-176688.

The cover 21 has a slide guide portion 29 which is curved outwardly to conform to the shape of the wire harness protector 15. The cover 21 is secured by engaging or welding securing pins 30 of the main body 14 to engaging holes 31.

Figure 4:
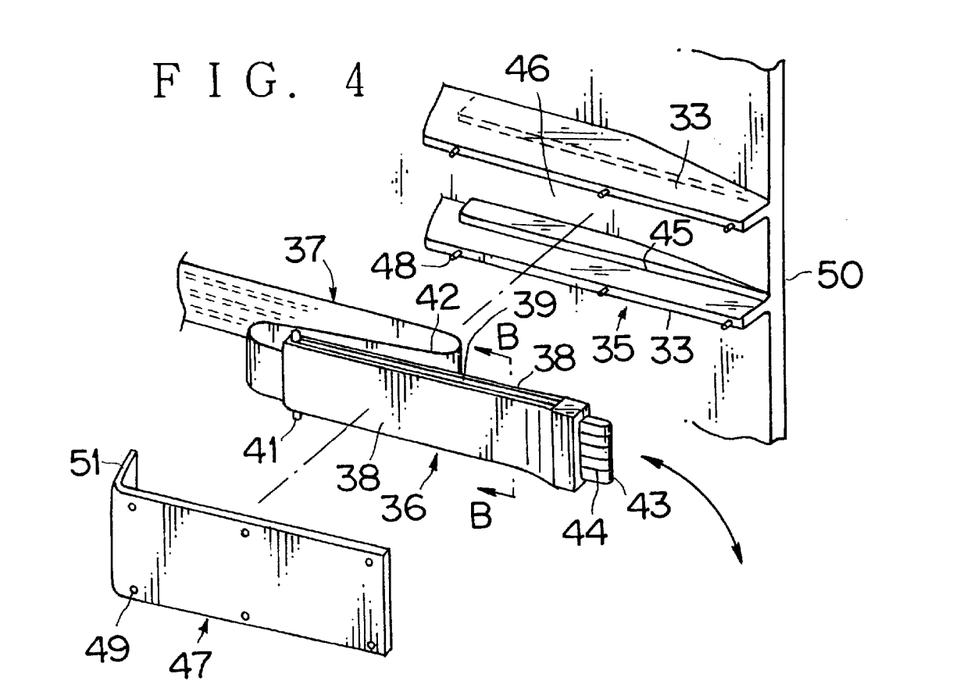
FIG. 4 is an exploded perspective view of a second embodiment of the door wire harness arrangement structure vehicles of the present invention.

FIG. 4 shows a second embodiment of the door wire harness arrangement structure.

In this structure, a pair of side walls 33 protrude from the surface of a door trim panel 50, forming a main body 35 of a wire harness protector case 34. A flexible flat wire harness protector 36 is slidably engaged with the main body 35. A flat wire harness 37 is inserted through the wire harness protector case 34.

Figure 5:
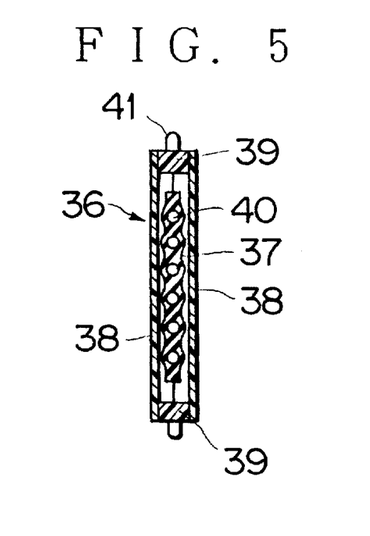
FIG. 5 is a sectional view taken along the line B—B of FIG. 4.

FIG. 5 is a vertical sectional view of the wire harness protector 36, which consists of: a pair of thin resin plates (thin flexible plates) 38 made of a synthetic resin which face each other in the thickness direction; and a pair of soft elastic members 39, such as elastomer, which join the thin resin plates 38 together at the upper and bottom ends in the width direction. The soft elastic members 39, which are rectangular in shape, are interposed between the thin resin plates 38. A thin resin plate 38 is secured to the soft elastic members 39 by adhering or welding.

The two thin resin plates 38 have flexibility in the thickness direction. The soft elastic members 39 serve as cushions, and are flexible in synchronization with the thin resin plates 38. The soft elastic members 39 absorb dislocation of the thin resin plates 38, and elastically restore the shape of the thin resin plates 38. Thus, the wire harness protector 36 can surely and smoothly slide when opening or closing the door.

The flat wire harness 37 in the wire harness protector 36 is flexible in synchronization with the wire harness protector 36 in the thickness direction. The flat wire harness 37 is well known as FFC (Flexible Flat Circuit), and contains a plurality of conductors 41. Slide pins 40 protrude upward and downward from the rear end of the thin resin plates 38.

In FIG. 4, the flat wire harness 37 extending from the wire harness protector 36 is curved in an S-shape, and then received by the wire harness protector case 34. The curved portion 42 makes the flat wire harness 37 flexible. This part of the structure has already been suggested in Japanese Patent Application No. 8-234071.

A connector 43 is attached to the front edge of the wire harness protector 36. This connector 43 is formed by exposing a conductor 44 of the flat wire harness 37. The main body 35 is provided with guide grooves or guide stairs 45 for guiding the slide pins of the wire harness protector 36. Thus, a harness receiving space 46 is formed in a position closer to the bottom of the main body 35.

The main body 35 is provided with a cover 47 which is secured by engaging securing pins 48 with engaging holes 49. The rear end 51 of the cover 47 is curved toward the door trim panel 50. The flat wire harness 37 is interposed between the cover 47 and the door trim panel 50.

FIGS. 6 to 9 show a third embodiment of the door wire harness arrangement structure.

Figure 6:
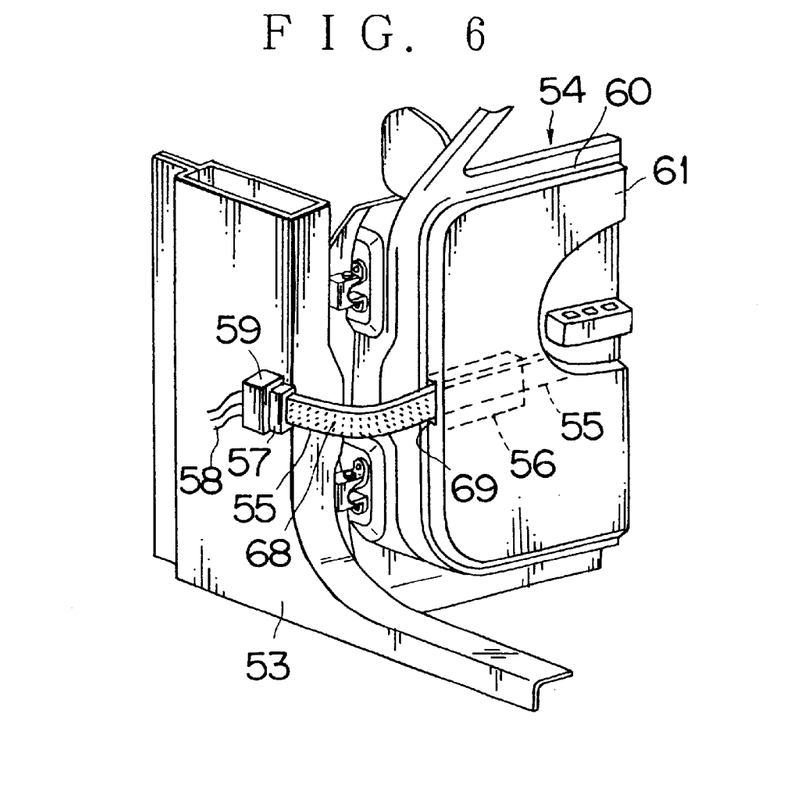
FIG. 6 is a perspective view of a third embodiment of the door wire harness arrangement structure for vehicles of the present invention.

In this structure, as shown in FIG. 6, a flexible flat wire harness 55 extends from a main body 53 to a vehicle door 54, and is slidably engaged with the door 54 so that it can be held in a wire harness case 56. A connector 57 at the front edge of the flat wire harness 55 is connected to a connector 59 of a wire harness 58 of the vehicle.

The flat wire harness 55 is bent in an S-shape and then received by a wire harness case 56 inside the door. The wire harness case 56 is attached to a door inner panel 60 or a door trim panel 61. Since the flatwire harness 55 is flexible, it bends in its thickness direction when opening or closing the door 54. Thus, it is not necessary to form an escape bulging portion on the door trim panel 61. Since it is also unnecessary to vibrate the connector 59 of the vehicle, the flat wire harness 55 can be easily secured.

Figure 7:
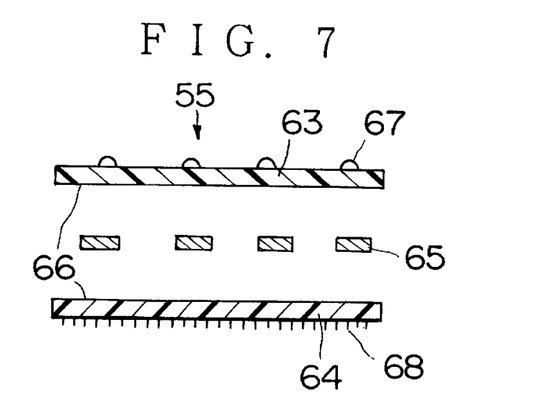
FIG. 7 is an exploded front view of the components of the flat wire harness of the third embodiment.
Figure 8:
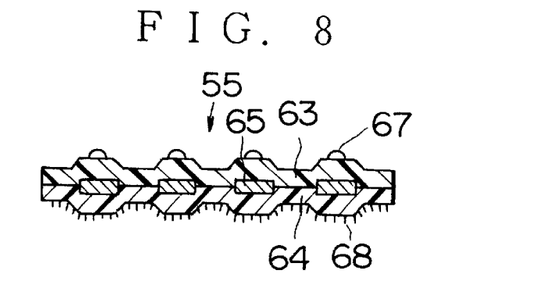
FIG. 8 is a front view illustrating how the flat wire harness of the third embodiment is assembled.

As shown in FIGS. 7 and 8, the flat wire harness 55 is formed by interposing flat conductors 65 between a pair of thin insulating films 63 and 64 which are made of a synthetic resin. The flat conductors 65 are arranged in parallel to each other. Adhesive layers 66 are formed on the inner sides of the insulating films 63 and 64. A plurality of slide protrusions 67 for reducing frictional resistance are integrally provided on the outer surface of the insulating film 63, which is the outer one of the two insulating films. A fabric sheet 68 is attached onto the outer surface of the inner insulating film 64.

The slide protrusions 67 reduce frictional resistance between the flat wire harness 55 and the front opening 69 of the wire harness receiving portion (the wire harness case) 56, as shown in FIG. 6, so that the flat wire harness 55 can surely and smoothly slide. From the viewpoint of shape retention and restoration, it is preferable that the insulating films 63 and 64 have some degree of elasticity.

Figure 9:
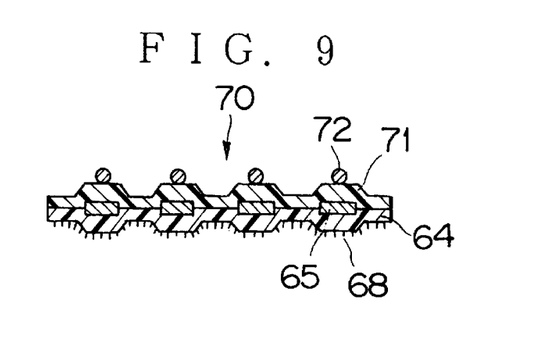
FIG. 9 is a front view of an example flat wire harness.

As shown in FIG. 9, slide protrusions 72 may be provided on an insulating film 71. In this particular case, it is preferable to employ hard circular members as the slide protrusions 72. As shown in FIGS. 7 to 9, the slide protrusions 67 and 72 are preferably positioned right above the respective flat conductors 65, because the slide protrusions 67 and 72 would not be buried into the insulating films 63 and 71, making smooth sliding possible and surely reducing frictional resistance.

The fabric sheet 68 stuck onto the insulating film 64 improves the appearance of the interior as well as the product value, and protects the insulating film 64 from damage. The fabric sheet 68 also reduces frictional resistance. Accordingly, with the help of the slide protrusions 67 and 72, and the fabric sheet 68, the flat wire harnesses 55 and 70 can be smoothly received into the wire harness case 56 with less frictional resistance caused when they are bent in an S-shape.

Just to reduce frictional resistance, the slide protrusions 67 and 72 may be provided on both surfaces of the flat wire harness, or the fabric sheet 68 may be stuck onto both surfaces of the flat wire harness. Here, it should be noted that each of the above embodiments can be applied to back doors of vehicles.

Figure 10:
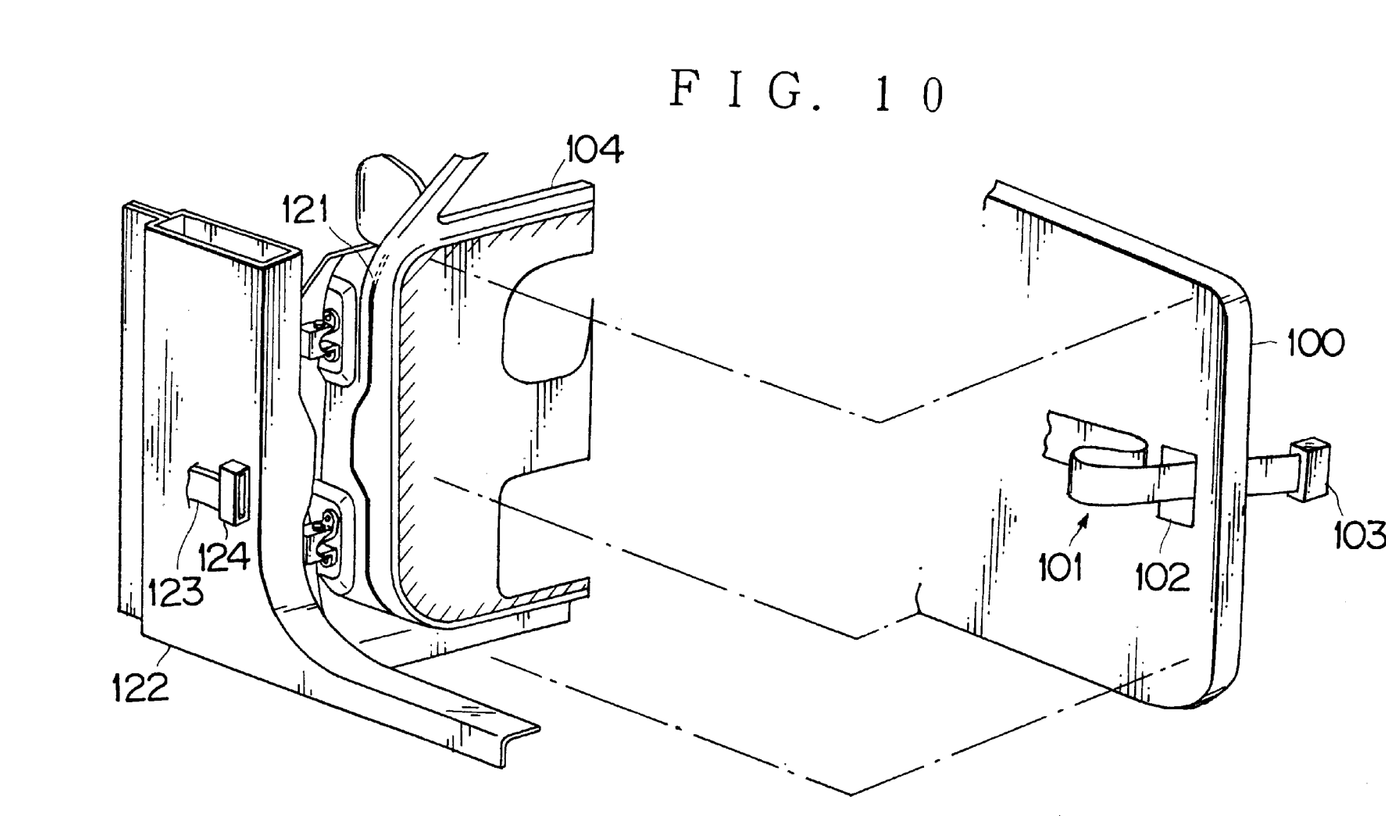
FIG. 10 is an exploded perspective view of a fourth embodiment of the door wire harness arrangement structure for vehicles of the present invention.

FIG. 10 shows a fourth embodiment of the door harness arrangement structure of the present invention.

In this structure, a flexible flat wire harness (a flat circuit body) 101 is slidably attached to a door trim panel 100, as in the previous embodiments. This part of the structure will be described later with reference to FIGS. 14 and 15.

The door trim panel 100 is provided with an opening 102 through which the flat wire harness 101 is inserted. The flat wire harness 101 is bent like an S-shape and then held on the rear side of the door trim panel 100. A connector 103 is provided at the front end of the flat wire harness 101. Here, it should be noted that FIG. 10 shows a simplified door trim panel 100. A connector 124 is thin and secured to a wire harness 123 on the vehicle body side. The door panel 104 will be explained later with reference to FIG. 14.

Figure 11:
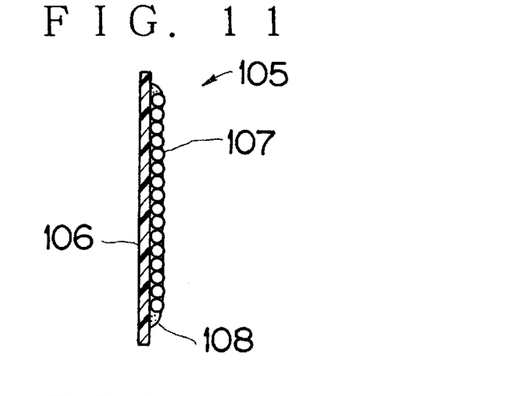
FIG. 11 is a front view of a first embodiment of the flat wire harness.
Figure 12:
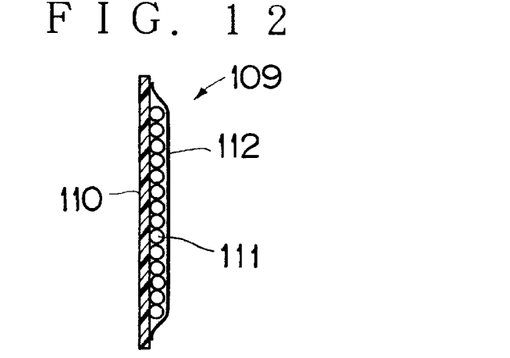
FIG. 12 is a front view of a second embodiment of the flat wire harness.
Figure 13:
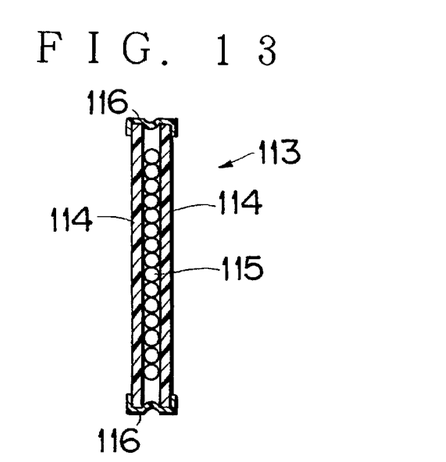
FIG. 13 is a front view of a third embodiment of the flat wire harness.

FIGS. 11 to 13 show example flat wire harnesses used in the above embodiment. A flat wire harness 105 shown in FIG. 11 is formed by arranging a plurality of wires 107 in parallel to each other on the surface of a thin resin plate (a thin resin sheet or a thin resin film) 106 made of an insulating resin, and securing them with an adhesive layer 108. The thin resin plate 106 is thermoplastic and 0.5 mm or less in thickness (so are the thin resin plates shown in FIGS. 12 and 13).

A flat wire harness 109 shown in FIG. 12 is formed by arranging a plurality of wires 111 in parallel to each other on the surface of a thin resin plate 110, and covering and securing them with a thin laminate sheet (a laminate layer) 112.

A flat wire harness 113 is formed by interposing a plurality of wires 115 arranged in parallel to each other between two thin resin plates 114. The two thin resin plates 114 are joined or covered with elastic members (rubber members) 116 at both ends in the width direction. The elastic members 116 eliminate gaps between the two thin resin plates 114 when they are bent, and provide them with restorability and water resistibility.

Each of the flat wire harnesses 105, 109, and 113 is flexible in the thickness direction, and expands and contracts in synchronization with opening and closing of the door.

Figure 14:
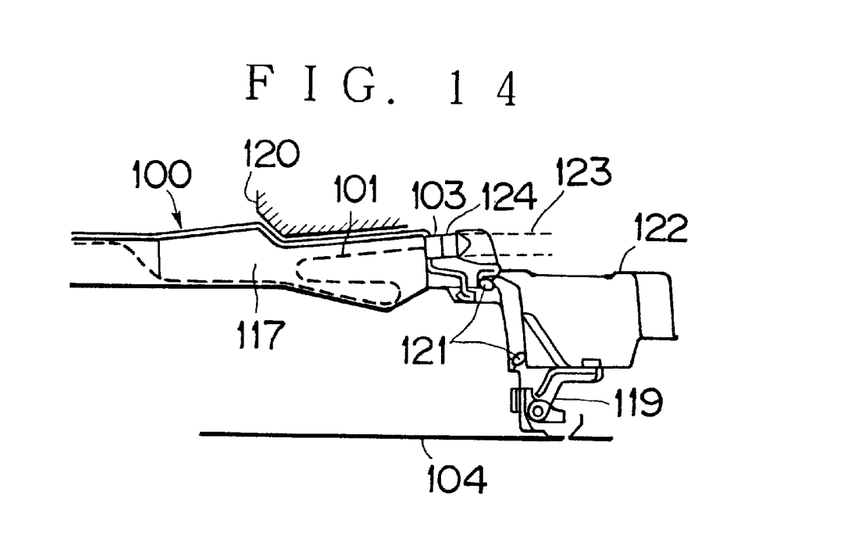
FIG. 14 is a vertical sectional view of a contained flat wire harness when the door is closed.

FIG. 14 shows the flat wire harness 101 when the door is closed.

The door trim panel 100 is provided with a wire harness receiving portion (a wire harness case) 117, into which the flat wire harness 101 that is bent in an S-shape is inserted. This figure shows the door panel 104, a hinge 119, an instrument panel 120, a weatherstrip 121, and the wire harness 123 on the side of a vehicle body 122. The connector 103 of the flat door wire harness 101 is situated in an inner position than the weather strip 121.

Figure 15:
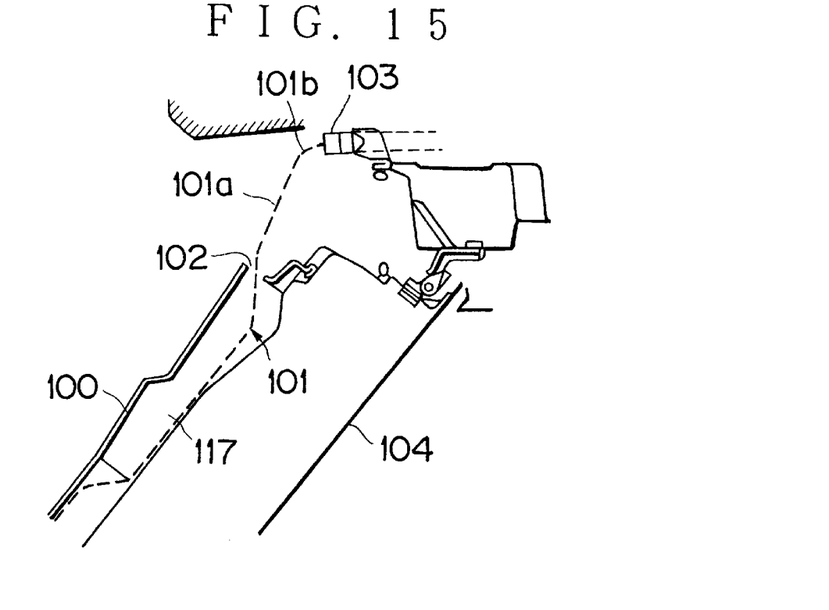
FIG. 15 is a vertical sectional view of an extended flat wire harness when the door is opened.

FIG. 15 shows the flat wire harness when the door is opened.

The flat wire harness 101 expands and is pulled through the opening 102 of the door trim panel 100, thus forming a circuit body crossing portion 111a. The connector 124 is secured to the vehicle body 122. The flat wire harness 101 is greatly bent right behind the connector 103 (this bent portion is denoted by 101b) so as to absorb vibration of the door.

Since it is not necessary to employ a wire harness protector, this embodiment can reduce the production costs as well as the weight of the products. The connection portion is increasingly reliable, because the circuit body crossing portion 101a extending from the door to the vehicle body is flexible, and the connector rotating mechanism is not necessary. Being flexible, the flat wire harness 101 (105, 109, or 113) can be used among vehicles of different types.

As described so far, a soft elastic member having an oval-shaped cross section bends with opening and closing of a door of a vehicle, and belt-like thin flexible plates provide the soft elastic member with restoring force, so that the wire harness protector can slide smoothly.

According to another embodiment described above, two thin flexible plates bend with opening and closing of a door of a vehicle, and a soft elastic member provided between the two thin flexible plates rectify dislocation of each of the thin flexible plates, so that the wire harness protector can slide smoothly.

The wire harness protector may have a flat shape so as to reduce the space occupied by the wire harness protector. Thus, an enough unoccupied space can be ensured inside the door, and the outlook of the door can be improved at the same time.

The flat wire harness may be able to slide and bend in synchronization with opening and closing of the door without the wire harness protection. Since no wire harness protector is needed, the occupied area inside the door can be reduced. Thus, the weight of the product and production costs can also be reduced.

The slide protrusions or a fabric sheet provided on both sides of the flat wire harness can reduce friction resistance, so that the flat wire harness can slide and bends smoothly.

In the above embodiments, the wire harness protector and the flat wire harness are flexible. This eliminates the needs of the connector rotating mechanism and the escape bulging portion on the door trim panel. Thus, the production costs can be reduced, and at the same time, more freedom can be allowed for design of the door trim panel.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A door wire harness arrangement structure for vehicles, comprising:
   a first connector;
   a second connector rigidly secured to a main body of a vehicle, said second connector being coupled with said first connector;
   a wire harness protector connected to said first connector at one end thereof and slidably arranged on a door of the vehicle at the other end thereof, said wire harness protector being made up of a soft elastic member and a thin flexible plate and also being flexible and restorable in its thickness direction; and
   a door wire harness arranged inside said wire harness protector, said door wire harness being electrically connected to said first connector, wherein
   said wire harness protector is taken into a protector case provided on a door inner panel or on a door trim panel, when the door is closed.

2. A door wire harness arrangement structure, comprising:
   a flat wire harness folded and held inside a door of a vehicle, said flat wire harness being flexibly arranged between the door and main body of the vehicle and being made up of wires secured on one flat and flexible thin thermoplastic resin plate, having a thickness of 0.5 mm or less, with an adhesive layer or with a thin laminate layer; and
   connectors for connecting a front end of said flat wire harness to the main body of the vehicle.

3. A door wire harness arrangement structure for vehicles, comprising:
   a wire harness protector slidably provided on a door of a vehicle, said wire harness protector being made up of a soft elastic member having an oval-shaped cross section and a pair of belt-like thin flexible plates provided on both ends of said soft elastic member in a width direction, and also being flexible and restorable in its thickness direction; and
   a door wire harness arranged inside said wire harness protector, said door wire harness being connected to a main body of the vehicle at a front end of said wire harness protector through connectors.

4. A door wire harness arrangement structure, comprising:
   a flat wire harness folded and held inside a door of a vehicle, said flat wire harness being flexibly arranged between the door and main body of the vehicle and being provided with slide protrusions on one surface and with a cover fabric on the other surface for reducing frictional resistance; and
   connectors for connecting a front end of said flat wire harness to the main body of the vehicle.

* * * * *